United States Patent

Deck

[15] 3,648,912

[45] Mar. 14, 1972

[54] PNEUMATIC APPARATUS FOR INCREMENTALLY ADVANCING TAPE

[72] Inventor: Philip E. Deck, Tulsa, Okla.

[73] Assignee: Telex Computer Products, Inc., Tulsa, Okla.

[22] Filed: Sept. 29, 1970

[21] Appl. No.: 76,403

[52] U.S. Cl. ....................226/97

[51] Int. Cl. ....................B65h 17/32

[58] Field of Search ....................226/97, 7; 34/156

[56] References Cited

UNITED STATES PATENTS 3,469,752 9/1969 Amos et al. ....................226/97 X

*Primary Examiner*—Allen N. Knowles
*Assistant Examiner*—Gene A. Church
*Attorney*—Head & Johnson

[57] ABSTRACT

A pneumatic apparatus for incrementally advancing tape including means of applying continuous force tending to advance the tape in a path across a process station, a brake block adjacent the tape path having a brake surface and a tape receiving recess adjacent the brake surface, a fluidic switch means adjacent to and spaced from the brake block with the tape path being between the switch means and the brake block, the switch means selectably directing a stream of air towards either the brake surface or the tape receiving recess to thereby force the tape into contact with the brake surface or the recess, and means of controlling the switch means to cause the air stream to be directed selectably towards the brake surface or the tape receiving recess.

5 Claims, 6 Drawing Figures

INVENTOR.
PHILIP E. DECK

BY Head & Johnson
ATTORNEYS

INVENTOR.
PHILIP E. DECK

BY *Head & Johnson*

ATTORNEYS

PNEUMATIC APPARATUS FOR INCREMENTALLY ADVANCING TAPE

BACKGROUND AND OBJECTS OF THE INVENTION

In recording and playback of digital data on magnetic recording tape it is frequently desirable that the tape be advanced in small increments rather than at a continuous rate. At the present time incremental tape advancement is usually accomplished by incremental rotation of a capstan against which the tape is pressed. To achieve rapid incremental advancement the capstan must be quickly started, brought to rotational speed, rotated for a small increment of time, and quickly stopped. Physical stress on the mechanism necessary to accomplish such rapid acceleration and deceleration more or less limit the maximum incremental rate rate which can be achieved by such mechanical means. A more serious problem, however, is that such mechanical means requires high degree of frictional engagement of the tape with the rotating capstan so as to minimize tape slippage when the capstan is brought rapidly from rest to rotational speed. Such high contact pressures and the possibility of frictional movement of the capstan relative to the tape can result in damage to the tape.

For these reasons it is highly desirable to provide some means of incrementally advancing tape which is characterized by: (1) rapidity of incremental movement of the tape; and (2) handling the tape in such a way as to minimize the possibility of physical damage to the tape.

It is therefore a general object of this invention to provide an improved means for incrementally advancing tape.

More particularly, an object of this invention is to provide a means of incrementally advancing tape capable of high rate of incremental advancement and in an arrangement resulting in minimum physical stress on the tape.

A still move particular object of this invention is to provide a means of incrementally advancing tape by utilization of an air stream directed against the tape including means of controlling the direction of the air stream as a means of controlling the tape incremental movement.

DESCRIPTION OF THE VIEWS

In FIG. 1 the stream of air is shown emerging from a fluidic switch means to force the tape into contact with a brake surface.

DETAILED DESCRIPTION

Figure 2:
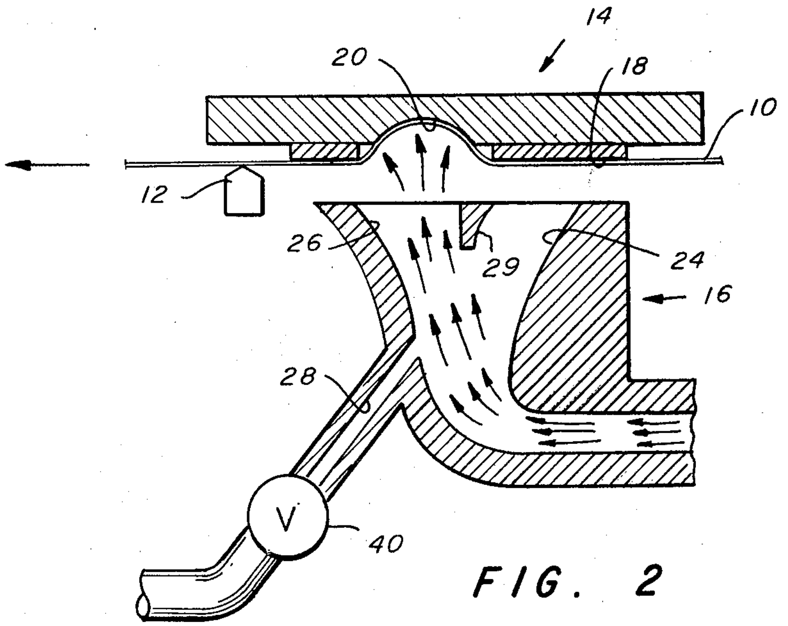
FIG. 2 is a cross-sectional view as shown in FIG. 1 showing a stream of air as directed to force the tape into a brake block recess.
Figure 1:
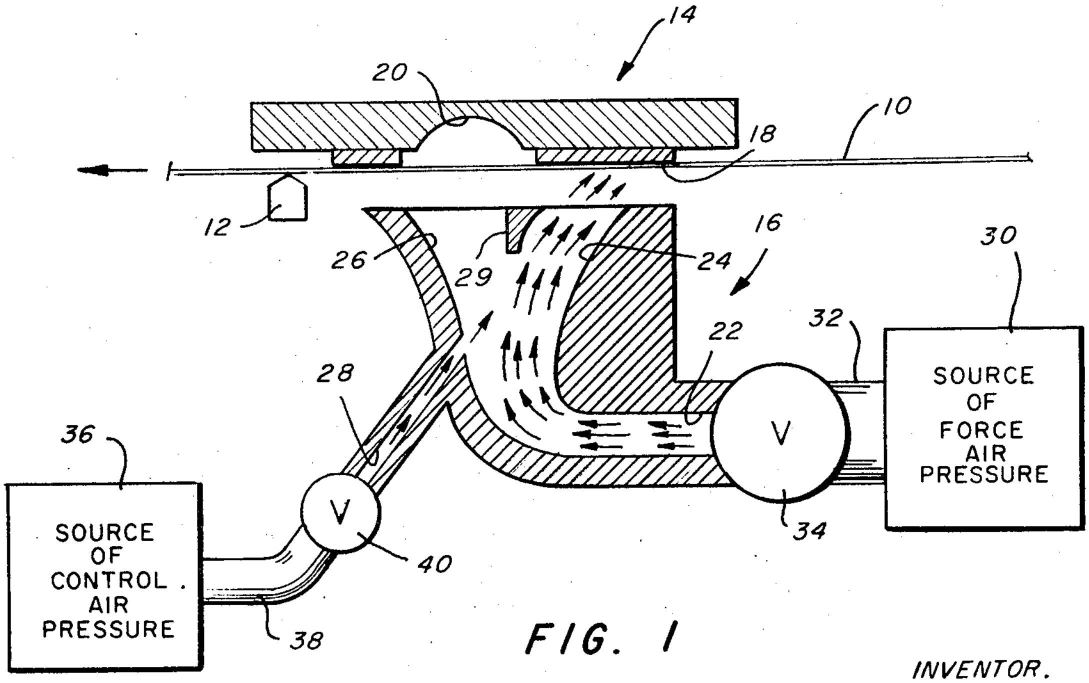
FIG. 1 is a cross-sectional view of a device embodying the invention for incrementally advancing tape.

Referring first to FIGS. 1, 2, 3 and 5, a first embodiment of the invention is shown. A tape 10, such as a magnetic tape as used for storage of digital data, is positioned for movement past a processing station 12. Tension is applied to tape 10 tending to move the tape past station 12 in the direction indicated by the arrow. Tension may be maintained by a variety of means, such as tension arms or vacuum buffers which are not shown as such are known devices used in connection with tape transports. Processing station 12 may be a read head, a write head, or a combination read-write-head, or the like. The purpose of this invention is to provide means of advancing tape 10 in small incremental steps of preselected length so that each incremental step moves the tape a preselected incremental length past processing station 12.

Positioned adjacent one surface side of tape 10 is a brake block generally indicated by the numeral 14 and adjacent the opposite surface of the tape is a fluidic switch means, generally indicated by the numeral 16. Brake block 10 has a configuration providing a braking surface 18 and, adjacent to the surface 18, a tape receiving recess 20. The fluidic switch means 16 supported adjacent to and spaced from the brake block 14 includes a force air inlet 22, a first force air outlet 24, a second force air outlet 26, and a control air inlet. The first force air outlet 24 is opposite brake surface 18 and the second force air outlet 26 is opposite the tape receiving recess 20. A decoder 29 separates the first and second force air outlets.

A source of force air pressure 30 is connected by conduit 32 to the force air inlet 22. A valve 34 in conduit 32 functions, when opened, to permit force air pressure to enter inlet 22 and, when closed, to block flow of force air to fluidic switch 16.

A source of control air pressure 36 is connected to the control air inlet 28 by means of a conduit 38. A valve 40 in conduit 38 functions, when opened, to permit flow of control air into the inlet 28 and, when closed, to block the flow of control air into the fluidic switch 16.

OPERATION OF THE EMBODIMENT OF FIGURES 1, 2, 3 AND 5

With valve 34 open force air enters the fluidic switch means 16 and normally flows, as shown in FIG. 2, out the second force air opening 26. The flow of air, as indicated by the arrows in FIG. 2, impinges on tape 10 and causes it to enter recess 20. When control valve 40 is open control air pressure enters control inlet 28 and diverts the flow of force air away from second force air outlet 26 and to first force air outlet 24 so that the flow of force air takes the path as indicated by the arrows in FIG. 1. In this mode, with control valve 40 open, air exiting from second force air opening 24 impinges upon tape 10 and forces it against brake surface 18. The tape then is pulled by the tension means previously mentioned from recess 20. Thus, opening of valve 40 causes a small increment of tape to be moved past the process station 12, the length of such increment being approximately the difference in the longer length of the path of the tape in FIG. 2 versus the shorter length of the path in FIG. 1.

The quantity of control air flow necessary to divert the path of the force air flow from outlet 26 to second outlet 24 is relatively small. Thus the control valve 40 is not required to handle large quantities of air flow and for this reason may be constructed of relatively small size, with light weight components capable of fast movement. Fluidic switch means 16 serves more or less as a pneumatic amplifier making possible the control of a relatively large stream of force air for the starting and stopping of tape 10 by means of a relatively small air stream passing through control air inlet 28.

Figures 3, 4, 5, 6:
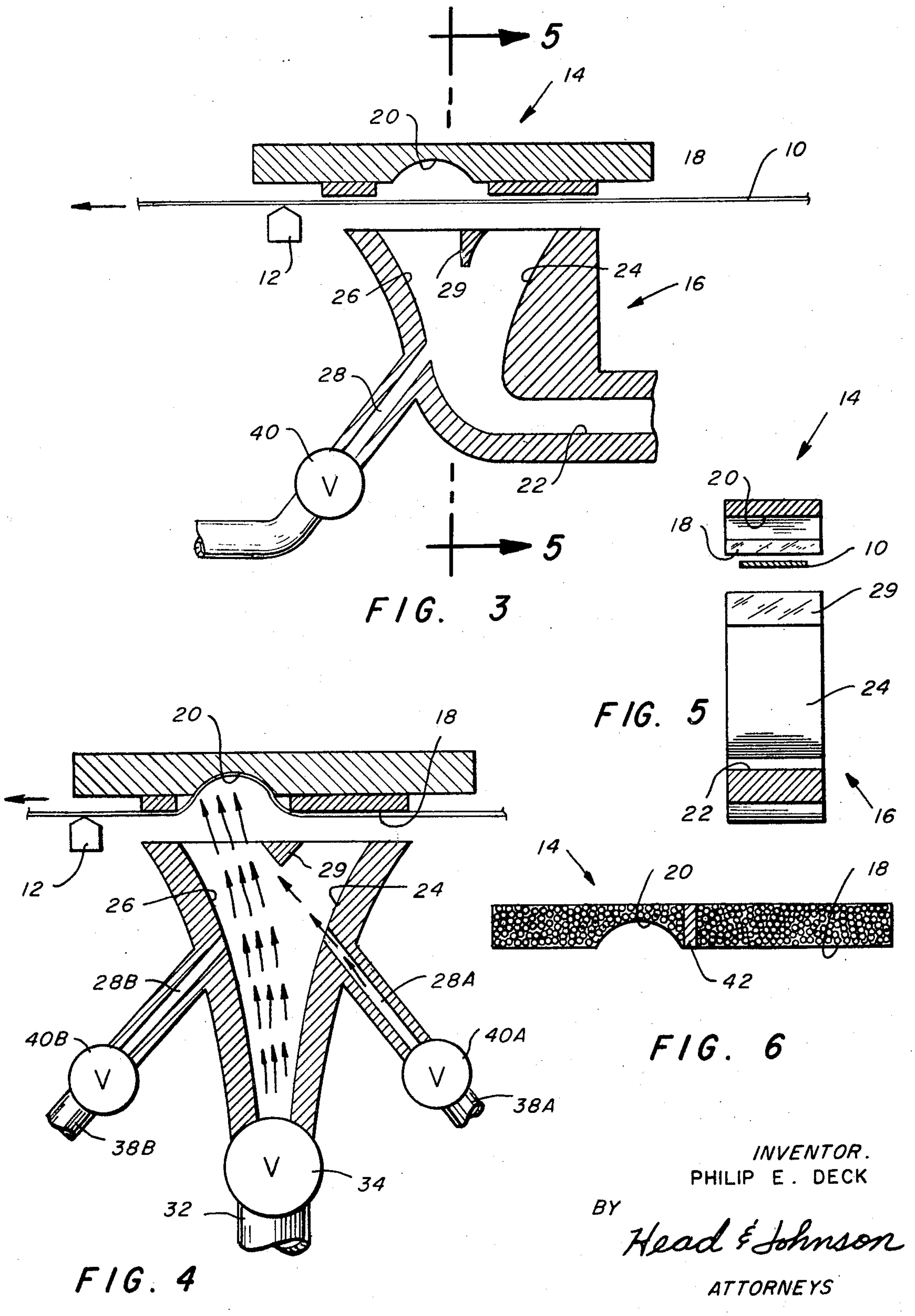
FIG. 3 is a cross-sectional view as shown in FIGS. 1 and 2 but showing the absence of a forced air stream, thus permitting the tape to be freely advanced or rewound.
FIG. 4 is a cross-sectional view of an alternate arrangement of the invention utilizing two separate control valves for controlling the direction of an air stream.
FIG. 5 is a cross-sectional view of the incremental tape advancing means taken along the line 5—5 of FIG. 3.
FIG. 6 is a cross-sectional view of the brake block portion of the invention showing the embodiment wherein the brake block is formed of a porous material.

When the control valve 40 is closed the tape is incrementally advanced a length depending upon the geometry of the recess 20. By switching action of the control valve 40 so as to switch the flow of air back and forth between first and second outlets 24 and 26 the tape is incrementally advanced. When it is desired to advance the tape at a continuous rate, or to rewind the tape, the force control valve 34 is closed, as shown in FIG. 3, so that no air pressure exists to move the tape in contact with any portion of the brake block 14 and the tape is then free to be moved in either direction without restraint. The tape is moved by auxiliary means which is not shown as such is not part of the invention.

ALTERNATE EMBODIMENT

FIG. 4 shows an alternate arrangement including a first control air inlet 28A and a second control air inlet 28B, each having a control valve 40A and 40B respectively. In this embodiment the stream of force air passing through the fluidic switch has no preferential exit, that is, does not normally exit through first force air outlet 24 or second forced air outlet 26 to the exclusion of the other outlet.

Instead, the outlet through which the force air stream will flow depends upon which of the control valves 40A or 40B is opened. In the arrangement of FIG. 4 one of the valves 40A and 40B must be closed and the other opened at all times. The device will not function with both control valves opened or both the control valves closed. In FIG. 4 the control valve 40A is opened so that control air enters the first control inlet 28A impinging on the flow of force air causing it to exit through second force air outlet 26. When control valve 40A is closed and control valve 40B is opened the forced air stream will exit through first control air outlet 24.

FIG. 6 shows an alternate embodiment of the brake pad 14. In this embodiment the entire pad is formed of a porous material. Such porous material fused spheres which permit the flow of air therethrough but nevertheless providing a smoother surface. The brake surface 18 is the lower of the porous material and recess 20 is formed of similar porous material. The separate the flow of air through the various portions a divider 42 is provided although the use of divider 42 is not mandatory. The utilization of porous brake block has the advantage that the boundary air layer trapped between the tape and the brake block which exists when the tape is moved rapidly toward the brake block, either towards the braking surface 18 or the tape receiving recess 20 is diffused through the porous material. This permits contact of the tape with the brake block without entrapment of the boundary air layer and thereby achieves more positive stopping action.

While the processing station 28 is shown to the left of the brake block 14 it can be seen that it can equally as well be to the right side.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of illustration but is limited only by the scope of the attached claim or claims, including the full range of equivalency to which each element thereof is entitled.

What is claimed:

1. A pneumatic apparatus for incrementally advancing a tape comprising:

means of applying continuous force tending to advance tape in a path across a process station;

a brake block adjacent the tape path having a brake surface thereon and a tape receiving recess adjacent said brake surface; and fluidic switch means adjacent to and spaced from said brake block the tape path being between said brake block and said switch means, said switch means selectably directing an air stream towards one of said brake surface and said tape receiving recess; and means controlling said fluidic switch means to cause said air stream to be directed selectably towards said brake surface and said tape receiving recess.

2. A pneumatic apparatus for incrementally advancing a tape comprising:

means of applying continuous force tending to advance the tape in a path across a process station;

a brake block adjacent the tape path having a brake surface thereon and a tape receiving recess adjacent said brake surface;

a fluidic switch means supported adjacent to and spaced from said brake block, the tape path being between the fluidic switch means and the brake block, the fluidic switch means having a force air inlet, a first force air outlet opposite said brake block recess, a second force air outlet opposite said brake block surface, and a control air inlet, the force air having communication between said first and second force air outlets;

means applying air pressure to said switch means force air inlet;

means selectably applying air pressure to said control air inlet whereby force air normally flows out of said switch means through said first force air outlet to impinge upon said tape opposite said brake block recess to force the same into said recess, force air being directed out of said switch means through said second outlet to impinge upon said tape opposite said brake surface and force the tape into contact with said brake surface, when air pressure is applied to said control air inlet.

3. A pneumatic apparatus for incrementally advancing tape according to claim 2 wherein said means of selectably applying air pressure to said control air inlet includes:

a high speed pneumatic control valve having an air inlet and an air outlet, the air inlet being connected to a source of control air pressure and the air outlet being connected to said fluidic switch means control air inlet.

4. A pneumatic apparatus for incrementally advancing a tape according to claim 2 wherein said fluidic switch means includes a first and second control air inlet, and wherein force air flows out of said switch means first force air outlet when air pressure is applied to said first control air inlet and force air flows out of said switch means second force air outlet when air pressure is applied to said second control air inlet.

5. A pneumatic apparatus for incrementally advancing a tape according to claim 4 wherein said means of selectably applying air pressured to said control air inlet includes:

a first and second high speed control valve each having an air inlet and an air outlet, the air inlet of both said first and second control valves being connected to a source of control air pressure, the air outlet of said first control valve being connected to said fluidic switch means first control air inlet and the air outlet of said second control valve being connected to said fluidic switch means second control air inlet.

* * * * *